United States Patent [19]

Allaire

[11] Patent Number: 5,221,164
[45] Date of Patent: Jun. 22, 1993

[54] POSITIVE RAKE INSERT HAVING SERRATIONS FOR CUTTING

[75] Inventor: Paul Allaire, Sterling Heights, Mich.

[73] Assignee: GTE Valenite Corporation, Troy, Mich.

[21] Appl. No.: 923,650

[22] Filed: Aug. 3, 1992

[51] Int. Cl.$^5$ .................... B23C 5/20; B23C 5/02
[52] U.S. Cl. ........................ 407/175; 407/114
[58] Field of Search ............... 407/42, 113, 114

[56] References Cited

U.S. PATENT DOCUMENTS

| | | | |
|---|---|---|---|
| 3,636,602 | 1/1972 | Owen | 407/113 |
| 3,791,001 | 2/1974 | Bennett | 407/113 |
| 3,875,631 | 4/1975 | Malinchak | 407/113 |
| 3,922,766 | 12/1975 | Malinchak | 407/113 |
| 4,140,431 | 2/1979 | Friedline et al. | 407/114 |
| 4,248,553 | 7/1981 | Kraemer | 407/114 |
| 4,531,864 | 7/1985 | Bylund | 407/114 |
| 4,867,616 | 9/1989 | Jakubowicz | 407/113 |

OTHER PUBLICATIONS

"Gor-M-Dex" *Machine Design* vol. 47 No. 19 p. 30 1975.

*Primary Examiner*—William E. Terrell

[57] ABSTRACT

A polygonal, indexable cutting insert having a positive rake and a cutting edge having a truncated sinusoidal form. Serrations on the side faces extend perpendicular to the top face.

7 Claims, 1 Drawing Sheet

POSITIVE RAKE INSERT HAVING SERRATIONS FOR CUTTING

BACKGROUND OF THE INVENTION

1. Field of the Invention

The present invention relates to a polygonal lay down indexable insert for cutting metals which has a positive rake and a truncated sinusoidal form along the cutting edge of the insert.

The present invention further relates to a polygonal form indexable cutting insert having a positive rake, and a truncated sinusoidal form along the cutting edge which intersects the top surface of the insert at a right angle and intersect the flanks of the insert at some point intermediate between the top and bottom surfaces and which insert is capable of being formed by a conventional pressing methods.

2. Description of the Related Art

Malinchak, U.S. Pat. No. 3,875,631 discloses a negative rake insert having sinusoidal serrations along the entire width of the cutting edge and flanks of the insert. Being a negative rake insert, the insert provides for eight faces which may be used in cutting operations. It is contemplated that the Malinchak insert may be used in concert with other inserts of like design such that the inserts are staggered according to a formula and presented to a metal piece for cutting.

Malinchak, U.S. Pat. No. 3,922,766 discloses a cutting tool having a plurality of inserts. Each insert is in the form of a circular disk or cylinder having a plurality of cutting teeth disposed symmetrically around the outer periphery. The cutting members are adjusted in the holder so that each tooth progressively cuts behind the tooth ahead of it so that the peaks of one edge cover a part of the trough of another edge whereby cutters progressively cut an article. The cutters can be adjusted so that as certain teeth wear, that the cutters can be rotated to bring additional new teeth into cutting position.

SUMMARY OF THE INVENTION

The present invention is a polygonal indexable insert having a positive rake. The insert comprises a top and bottom surface which are substantially parallel to each other and separated by a sidewall running substantially unbroken therebetween to define a body. The sidewall is comprised of a plurality of side flank surfaces which are substantially planar in shape. Each side flank surface extends from corner to corner of the insert. Each side flank surface intersects the bottom surface along its edge at an obtuse angle and intersects the top surface along its edge at an acute angle so that the insert may be seen to have a positive rake profile along each side flank. The intersection of each side flank at the top surface forms a cutting edge. Each cutting edge has a plurality of equally spaced serrations formed in each side of the insert and having their center lines spaced apart from each other. Each serration is perpendicular at the top surface and intersects the side flank at a point intermediate the width of the side flank face. It is contemplated that the side flanks extend outwardly from the bottom surface toward the top at approximately 11°.

The serrations are preferably sinusoidal in shape and are truncated at each crest of the sinusoidal curve below the mean line of the curve. Although the insert may be any polygonal shape, it is preferred that the insert is a regular shaped polygon and each cutting edge is identical to the others. A central aperture may be provided to secure the insert in place.

DETAILED DESCRIPTION OF THE PREFERRED EMBODIMENT

Figure 1:
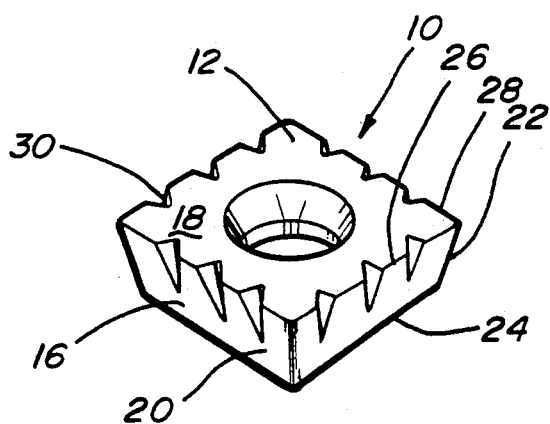
FIG. 1 is a perspective top view of the insert of the present invention.
Figure 4:
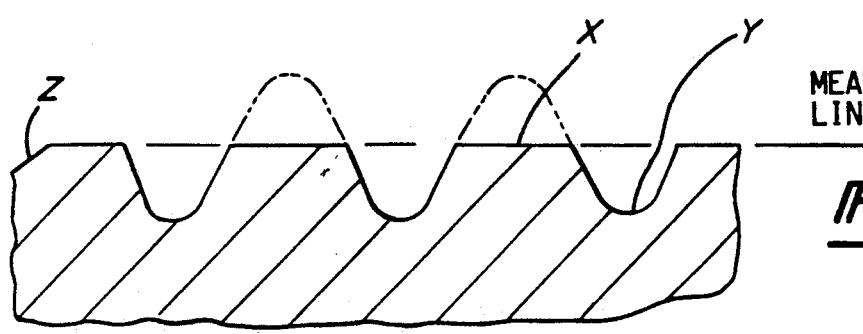
FIG. 4 is a detailed view of the cutting edge of FIG. 2 showing the truncated sinusoidal configuration of the cutting insert.

Turning now to the drawings, wherein like numerals reference like structures, insert 10 is comprised of a top surface 12, a bottom surface 14, and a sidewall 16 extending substantially unbroken therebetween to define a body 18. The insert is polygonal in shape and is preferably a regular polygon. Each sidewall is comprised of a side flank 20 which extends from corner to corner, each designated as 22. Each side flank intersects the bottom surface at edge 24 and the top surface at edge 26. It should be noted that the present invention relates to a positive rake insert. Accordingly, the components side flanks intersect the bottom edge at an obtuse angle and intersect the top edge at some acute angle. The intersection of each side flank and the top surface forms the cutting edge 28. Each cutting edge has a plurality of equally spaced, preferably sinusoidal shaped serrations formed in each cutting edge of the insert. The center lines of the sinusoidal curves are spaced apart from each other. Each serration is situated along the cutting edge and intersects the top surface perpendicular to the surface itself and intersects the side flank at some point intermediate the top and bottom surfaces. Turning now to FIGS. 1 and 4, it can be seen that serrations 30 are flattened at the crest of the curve whereas the roots of the curve are intact. Thus, it can be seen that the sinusoidal curve is truncated. By this term, it is meant that the crest of the curve is flattened. Preferably, the curve is truncated below the mean line of the sinusoidal curve.

It is further understood that the insert described herein is used in plurality in a cutting tool. Specifically, the inserts are arranged in rows in insert pockets. Each pocket has seating surface and side walls and the insert is fastened thereto. The next row is arranged in tool pockets so that the relationship between each row of inserts is best seen using the formula $$z = \frac{Y}{2}$$

S is the distance between inserts in the cutting tool body;

Z is the chamfer of the insert;

Y is the width of the serration below the mean line of the sinusoidal curve. It is further preferred that the inserts are arranged in helical rows is in the direction of cutting.

Turning now to FIG. 4, the width of the serration portion "Y" is seen to differ from the width of truncated portion X. Thus, it can be seen that by truncating the sinusoidal curve below the mean line, X>Y. Similarly Z, which is the chamfer of the insert, is 0.008" to 0.01" less than ½ the Y dimension so that when the inserts are positioned in a cutter tool body, the X dimension of an insert in an adjacent flute or row will overlap and cover the space between adjacent inserts in the next row according to the formula $$2Z + 0.015/0.020 = Y$$

The positive rake insert of the present invention may further be equipped with a central aperture to facilitate holding the insert in a tool pocket holder.

Figure 2:
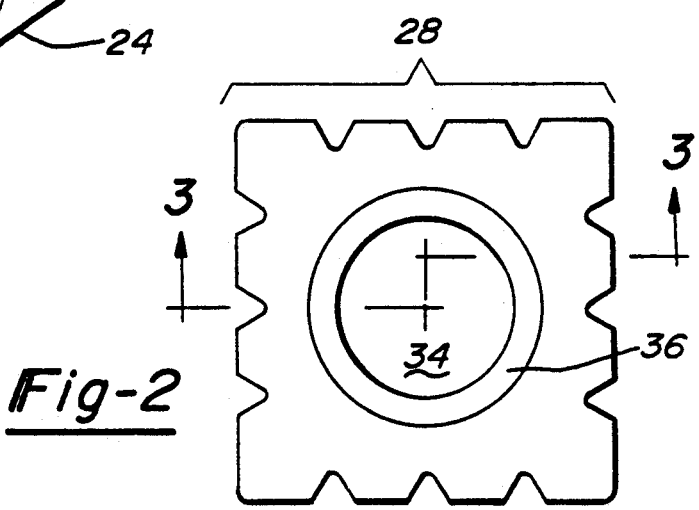
FIG. 2 is a top plan view of the insert showing a configuration of the cutting edges
Figure 3:
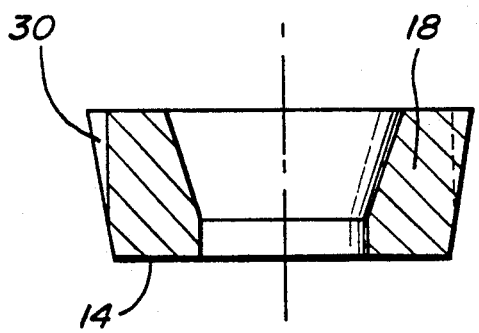
FIG. 3 is a cutaway view of the insert along lines 3 as taken in FIG. 2, showing the orientation of the sinusoidal curves in the side flanks of the insert.

Turning now to FIGS. 2 and 3. FIG. 2 is a top plan view of the insert. Note the central aperture 34 with counter bore 36 for fastening the insert into an insert pocket of a tool. Note that each edge 28 is identical. However, those skilled in the art recognize that the insert may be any polygonal shape and the sides need not be identical.

FIG. 3 is taken along lines 3—3 of FIG. 2 and shows a cross section of the insert indicating the manner in which the truncated sine curve serration intersects the top surface at 90°, as shown by line 30, and the side flank at some point along the width of the side flank intermediate the top and bottom edge.

Those skilled in the art will recognize that the invention described herein is capable of many modifications and variations without departing from the scope and spirit of the invention.

I claim:

1. A polygonal, indexable cutting insert having a positive rake, comprising;

a top surface and bottom surface substantially parallel to each other and separated by a sidewall running substantially unbroken therebetween to define a body, said sidewall comprised of a plurality of side flank surfaces which are substantially planar, each side flank surface extending from corner to corner of the insert body and having a width extending from the top surface to the bottom surface, each side flank intersects the bottom surface along its entire edge at an obtuse angle and the top surface along its edge at an acute angle so that the insert has a positive rake profile; said intersection of each side flank and the top surface forms a cutting edge; each said cutting edge has a plurality of equally spaced serrations having their center lines spaced a part from each other; each serration being formed by a groove with a bottom extending perpendicular to the plane of the top surface and intersecting the side flank intermediate the width of said side flank.

2. The insert of claim 1, wherein said serrations are sinusoidal in shape.

3. The insert of claim 1, further including a centrally located aperture in the top surface and extending through the body of the insert, said aperture further equipped with a counterbore at the top surface.

4. The insert of claim 2, wherein said sinusoidal serrations are truncated below the mean line of the sinusoidal curve.

5. The insert of claim 1, wherein the insert is shaped as a regular polygonal.

6. The insert of claim 1, wherein the positive rake of each side flank is approximately 11°.

7. The insert of claim 1, wherein each corner is chamfered at approximately 45° to 90°.

* * * * *